United States Patent [19]

Ford

[11] 4,113,068
[45] Sep. 12, 1978

[54] HYDRAULICALLY OPERATED DISC BRAKES

[75] Inventor: John Charles Ford, West Midlands, England

[73] Assignee: Girling Limited, Birmingham, England

[21] Appl. No.: 688,914

[22] Filed: May 21, 1976

[30] Foreign Application Priority Data

May 29, 1975 [GB] United Kingdom ............... 23525/75

[51] Int. Cl.² ........................................... F16D 55/228
[52] U.S. Cl. .................................... 188/72.5; 188/73.5
[58] Field of Search ................... 188/72.5, 73.4, 71.8, 188/73.5, 196 P, 73.3, 73.6, 71.1

[56] References Cited

U.S. PATENT DOCUMENTS

| 3,081,843 | 3/1963 | Dotto et al. | 188/73.6 |
|---|---|---|---|
| 3,243,017 | 3/1966 | Kleinstuck | 188/196 P X |
| 3,245,500 | 4/1966 | Hambling et al. | 188/73.4 X |
| 3,375,906 | 4/1968 | Hayes | 188/73.3 |
| 3,480,116 | 11/1969 | Rath | 188/73.3 |
| 3,536,167 | 11/1970 | Rath | 188/73.4 |
| 3,712,422 | 1/1973 | Haraikawa et al. | 188/73.4 X |
| 3,939,945 | 2/1976 | Habgood | 188/72.5 |

FOREIGN PATENT DOCUMENTS

| 1,189,397 | 3/1965 | Fed. Rep. of Germany | 188/73.3 |
|---|---|---|---|
| 2,014,468 | 10/1970 | Fed. Rep. of Germany | 188/73.3 |
| 2,421,855 | 11/1974 | Fed. Rep. of Germany | 188/73.4 |

*Primary Examiner*—George E. A. Halvosa
*Attorney, Agent, or Firm*—Scrivener, Parker, Scrivener & Clarke

[57] ABSTRACT

An hydraulically operated disc brake includes a yoke slidably mounted on a stationary member for movement in a direction parallel to the disc and two pistons for actuating the brakes. The first piston acts directly on a friction pad and the second piston acts directly on the yoke and indirectly on a second friction pad through the yoke. The yoke is mounted on the second piston and on a retaining member which extends between the yoke and the stationary member to locate the friction pads against radial movement. The retaining member is rigidly secured to the stationary member and a resilient connection is provided between the stationary member and the yoke.

14 Claims, 10 Drawing Figures

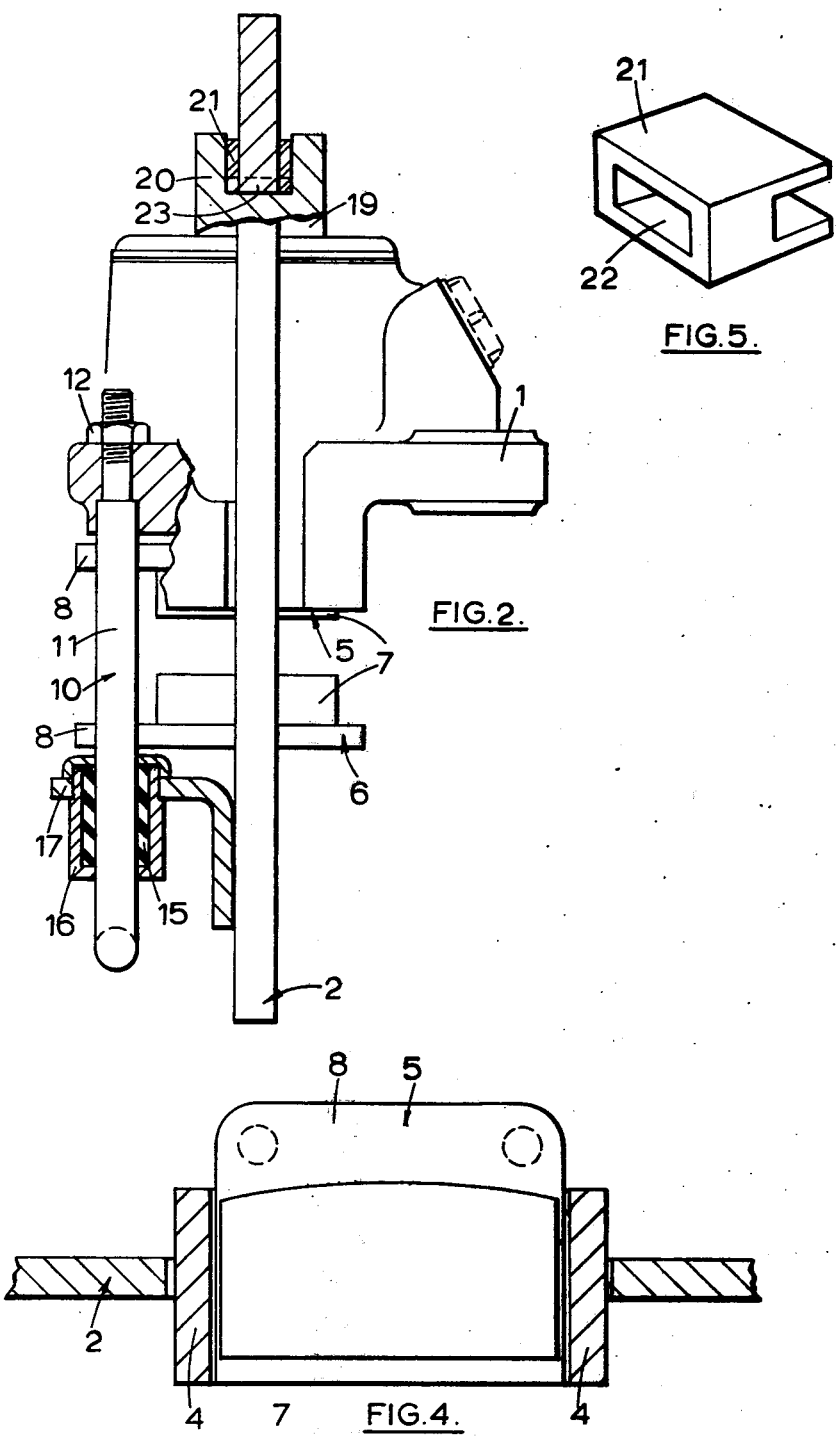

HYDRAULICALLY OPERATED DISC BRAKES

SPECIFIC DESCRIPTION

This invention relates to improvements in hydraulically operated disc brakes for vehicles, the disc brakes being of the kind comprising a stationary drag-taking member located against one face of a rotatable disc, a yoke extending over the peripheral edge of the disc and slidably guided on the stationary member for movement in a direction substantially parallel to the axis of the disc, friction pad assemblies for engagement with opposite faces of the disc, a retaining member extending between the stationary member and the yoke to locate the friction pad assemblies against movement in a radial direction, and an hydraulic actuator in the stationary member for applying one of the pad assemblies, known as the directly actuated pad assembly, directly to the adjacent face of the disc, the other friction pad assembly, known as the indirectly actuated pad assembly, being applied to the other face of the disc by the reaction of the actuating means which causes the yoke to slide with respect to the disc in a substantially axial direction, the drag on the indirectly actuated friction pad assembly being transmitted to the stationary member through the yoke, and the hydraulic actuator comprising oppositely acting first and second pistons of which the first acts on the directly actuated friction pad assembly and the second acts on the yoke.

In one known disc brake of the kind set forth the yoke comprises a plate which is slidably guided in grooves in the stationary member which are greater in depth than the thickness of the plate, and spring means are provided for biassing the plate against either the radially innermost or radially outermost side faces of the grooves, the indirectly actuated friction pad assembly being coupled to the yoke by locating means in the form of pins which also co-operate with the stationary member. In such a construction at least parts of the spring means lie within the grooves so that should any dirt or corrosion build up in the grooves, a problem could be encountered when the brake is to be applied since engagement of the spring means with such build-up can impede sliding movement of the yoke with respect to the stationary member. Particularly, this is likely to occur when the spring means do not have the same projected area throughout the entire length of the grooves, so that, for the brake to be applied, either the build up has to be displaced or the spring loads acting between the plate and the grooves will vary. In either case the brake applying force will have to be increased and in severe conditions of build up the yoke may move with respect to the stationary member through an axial distance insufficient to cause the indirectly actuated pad assembly to engage the disc. Again difficulty may be experienced in releasing the indirectly actuated friction pad assembly from the disc when hydraulic pressure acting on the pistons to apply the brake is relieved.

According to our invention in an hydraulically operated disc brake of the kind set forth for vehicles the yoke is supported on the second piston and by the retaining member for the pad assemblies and a resilient connection is provided between the retaining member and the yoke, the retaining member in turn being rigidly secured to the stationary member.

Preferably resilient bushes are provided between the yoke and the second piston and between the yoke and the retaining member. However, the yoke may be bolted rigidly to the second piston. The retaining member is preferably detachably secured to the stationary member. This method of supporting the yoke eliminates the necessity for providing accurately inclined grooves in the stationary member, so the surfaces of the stationary member which are engaged by the yoke may be made flat. Also the resilience of the material of the bushes tends to retract the yoke when the brake is released, thereby removing the force from the indirectly actuated friction pad assembly.

By carefully selecting the relative dimensions of the bushes, the retaining member and the yoke, the yoke can at all times be located in engagement with the one face of the stationary member with which it will normally engage when the brake is applied with the disc rotating in a normal forward direction. This ensures substantially silent operation by eliminating as far as possible the noise or "klonk" of metallic engagement therebetween when the brake is applied. However, biassing is not essential as the "klonk" will be damped in any case by the resilient bushes.

By varying the relative dimensions and/or utilising material of different properties for the bushes the yoke may be tilted slightly with respect to the stationary member and the plane of the disc so that in a "brake released" condition the trailing end of the indirectly actuated friction pad assembly is closer to the disc than the leading end. Effectively the force applied to the indirectly actuated friction pad assembly is offset with respect to the centre of pressure of that pad assembly and this tends to reduce or eliminate brake squeal.

When the pad retaining member includes spaced pin portions a bush is located between each pin portion and the yoke. It is convenient therefore for the relative dimensions and/or material of the bushes which co-operate with the pin portion to be selected in order to provide the effect described above.

The invention will now be described by way of example with reference to the accompanying drawings in which:

FIG. 1 is a plan view of a disc brake,

FIG. 2 is an end view of the brake including a section on the line 2—2 of FIG. 1, FIG. 3 is a transverse section through the brake in the plane of the directly actuated friction pad assembly, FIG. 4 is a transverse section through an alternative embodiment of the brake in the plane of the directly actuated friction pad assembly, FIG. 5 is a perspective view of the resilient bush for the hydraulic actuator.

FIG. 6 is a section through the brake on the line 6—6 of FIG. 1, showing a modification, FIG. 7 is a transverse section through a modified brake on the line 7—7 of FIG. 1, with the pad assemblies removed for clarity, FIG. 8 is a section on the line 8—8 of FIG. 1, FIG. 9 is a section similar to FIG. 8 but showing a modification, and FIG. 10 is a section on the line 10—10 of FIG. 1 of the same brake as FIG. 9.

The disc brake illustrated in the drawings comprises a stationary drag-taking member 1 located adjacent to one face of a rotatable disc, not shown. A yoke 2 in the form of a metal pressing, casting or forging and having a central aperture 3 extends over the peripheral edge of the disc and the yoke 2 is located against circumferential movement relative to the stationary member 1 by the engagement of edges of the aperture 3 either in axially extending grooves in the outer face of the circumferentially spaced arms 4 which extend towards the disc and form parts of the stationary member, as shown in FIG. 3, or against flat outer faces of the arms 4, as shown in FIG. 4.

Friction pad assemblies 5 and 6 are located on opposite sides of the disc. Each friction pad assembly 5, 6 comprises a pad 7 of friction material for engagement with an adjacent face of the disc and a rigid backing plate 8 carrying the pad. The friction pad assembly 5 is slidably guided for movement towards and away from the disc between the arms 4, and the backing plate 8 of the pad assembly 6 is received within a notch 9 in an adjacent edge of the aperture 3.

The friction pad assemblies 5 and 6 are located in position in the brake by a pad retaining member 10. As illustrated in FIGS. 1 and 2 the retaining member 10 comprises a pair of spaced parallel pin portions 11 each of which extends across the disc through openings in the backing plates 8 and has a threaded end portion of reduced diameter which projects through the stationary member 1 to receive a nut 12 which acts to clamp a shoulder 13 at the step in diameter against the stationary member 1. The pin portions 11 are interconnected at their outer edges by a bridge piece 14 and adjacent to their outer ends the pin portions project through bushes 15 of rubber or other resilient material which are retained in cylindrical housings 16 carried by a common bracket 17 which is upstanding from the yoke 2, as shown in FIG. 2.

The stationary member 1 houses an actuator comprising a cylinder bore in which work opposed first and second hydraulic pistons 18 and 19. The piston 18 acts directly on the friction pad assembly 5, and the piston 19 acts on the yoke 2. As illusrated in FIG. 2 the second piston 19 is provided with a bifurcated extension 20 in which the yoke 2 is received and a bush 21 of channel section made of rubber or other suitable material is disposed between the wall of the extension 20 and the yoke 2. The bush 21 shown in FIG. 5 is provided with an aperture 22 through which a tongue 23 on the yoke 2 projects into engagement with the face of the bifurcated extension 20.

In an alternative embodiment shown in FIG. 6 the yoke is rigidly bolted to the second piston 19 by means of bolt 30.

When a space in the cylinder bore between the pistons 18 and 19 is pressurized the friction pad assembly 5 is applied directly to the disc by the piston 18, and the piston 19 acts to urge the yoke 2 axially in the opposite direction which, in turn, applies the friction pad assembly 6 indirectly to the opposite face of the disc. During this movement the bushes 15 move with the yoke 2 and tend to slide relative to the pin portion. However, a certain degree of compression of the material of the bushes takes place so that on release of the brake, the bushes 15 tend to extend to urge the yoke 2 in a direction such that the pad assembly 6 is urged away from the disc.

The yoke 2 is therefore supported resiliently by means of the bushes 15 and 21 and the bushes 15 and 21 also act to restore the yoke to a neutral position at the termination of the brake application due to the engagement of the pin portions 11 in the bushes 15 and the reception of the tongue 23 in the aperture 22.

When the brake is applied the drag on the pad assembly 5 is taken by the inner face of one of the arms at the leading end of the assembly, and the drag on the pad assembly 6 is transmitted through the yoke 2 to the outer face of the other arm. The bushes 15, 21 can be arranged so that the engaged faces of the yoke 2 and the stationary member 1 are normally held in engagement to eliminate noise when the brake is applied with the disc rotating in a forward direction.

FIG. 7 shows an alternative embodiment in which the relative dimensions of the bushes the yoke 2 and the retaining member 10 are chosen such that the yoke is located at all times in engagement with face 3 of the stationary member 1. This is the face with which the yoke will normally engage when the brake is applied with the disc rotating in a normal forward direction. The openings in the bushes for receiving the pins 11 are eccentrically positioned and located in the bracket 17 as shown so that the yoke engages face 3 of the stationary member.

FIG. 9 shows the first pin and housing on one side of the assembly and FIG. 10 shows the second pin and housing on the other side of the assembly.

Figure 1:
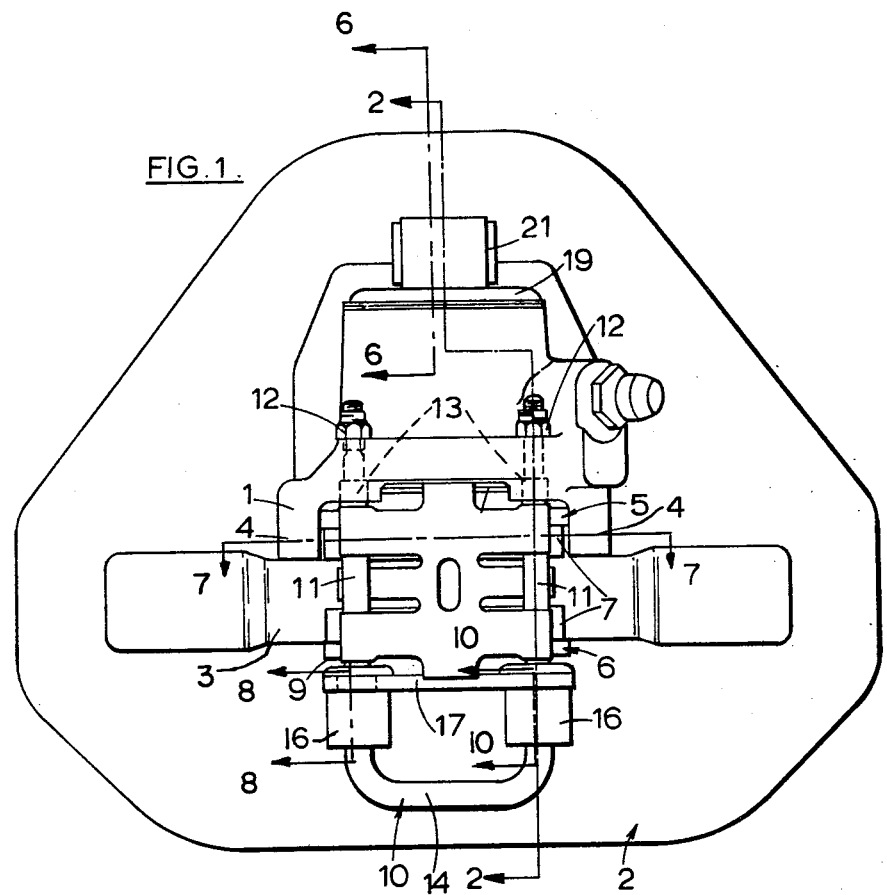
Figure 3:
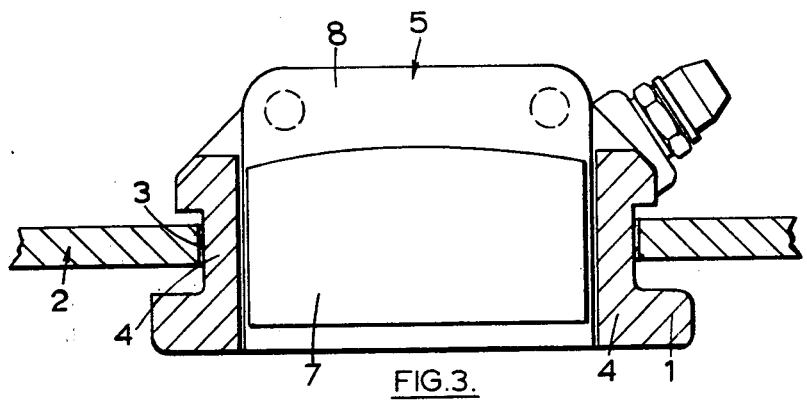
Figure 6:
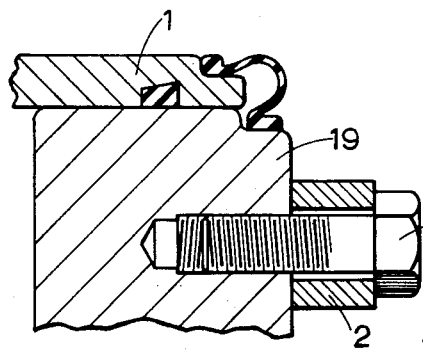
Figure 7:
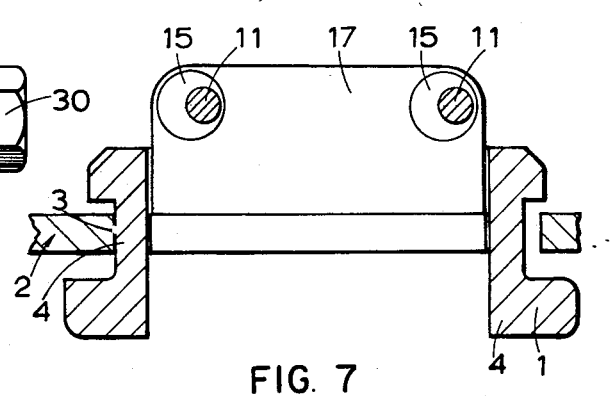
Figure 8:
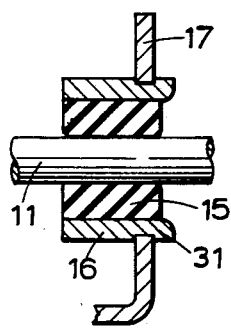
FIG. 8 shows a part of one of the pins assembled in the bracket in a modified assembly in which the bushes 15 are bonded to the housings 16 and the housings are swaged to the bracket as shown at 31.
Figure 9:
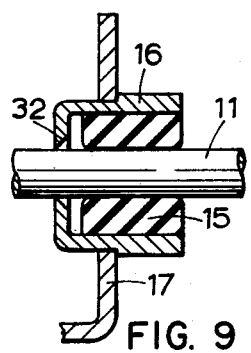
FIGS. 9 and 10 show a modification in which the housings on each side are provided with sharp edges in engagement with the pins so as to scrape any dirt or build up off the pin when the brake is applied.
Figure 10:
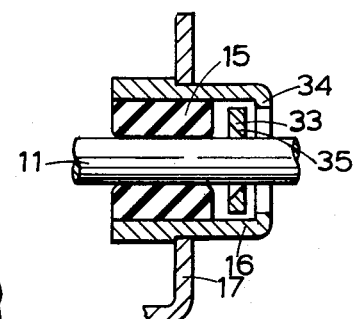

The first housing 16 has a sharp edge 32 at its inboard end as shown in FIG. 9. The second housing 16 includes a separate washer 33 spaced from its inboard end 34 and having a sharp edge 35 in engagement with the pin 10, as shown in FIG. 11. This arrangement ensures that the pins will not cross-find due to manufacturing tolerances.

I claim:

1. An hydraulically operated disc brake for a vehicle comprising a stationary drag-taking member, a rotatable disc adjacent to which said stationary drag-taking member is located, a yoke member extending over the peripheral edge of said disc and slidably guided on said stationary member for movement in a direction substantially parallel to the axis of said disc, a directly actuated friction pad assembly positioned adjacent to said stationary member for engagement with one side of said disc, an indirectly actuated friction pad assembly for engagement with the other side of said disc, an hydraulic actuator in said stationary member comprising oppositely acting first and second pistons, said first piston acting on said directly actuated friction pad assembly and said second piston acting through said yoke member on said indirectly actuated friction pad assembly, there being no direct engagement between said yoke and said stationary member for preventing movement of said yoke radially of the disc, drag on said indirectly actuated friction pad assembly being transmitted to said stationary member substantially solely through said yoke member, means for locating said friction pad assemblies against movement in a radial direction comprising a retainer extending between said stationary member and said yoke member, first and second axially spaced support means for supporting said yoke member comprising the sole support of said yoke member, said first support means consisting of a connection between said yoke member and said second piston, said second support means consisting of resilient connecting means between said yoke member and said retainer outboard of said indirectly actuated pad assembly, said resilient connecting means comprising at least one elastomeric bush and a mounting for said bush on said yoke, said retainer comprising at least one pin portion having first and second ends, said first end being received in said bush, and said second end being rigidly received in an opening in said stationary member, and a releasable connection detachably securing said retainer to said stationary member for locating said retainer against movement in an axial direction with respect to said stationary member.

2. An hydraulically operated disc brake as claimed in claim 1, wherein a resilient bush is provided between said yoke member and said second piston.

3. An hydraulically operated disc brake as claimed in claim 1, wherein said retainer member includes spaced pin portions, a bush being located between each pin portion and said yoke member.

4. An hydraulically operated disc brake as claimed in claim 3, wherein a bridge piece interconnects said pin portions at their corresponding first ends, and a common bracket upstanding from said yoke member carries housings which retain said bushes, said first ends of said pin portions projecting through said bushes.

5. An hydraulically operated disc brake as claimed in claim 1, wherein said pin portion includes a step in diameter, the portion of reduced diameter being threaded and projecting through said stationary member, a nut being received on said threaded portion and acting to clamp said step in diameter against said stationary member.

6. An hydraulically operated disc brake for a vehicle comprising a stationary drag-taking member, a rotatable disc adjacent to one side of which only said stationary drag-taking member is located, a yoke member extending over the peripheral edge of said disc and slidably guided on said stationary member for movement in a direction substantially parallel to the axis of said disc, a directly actuated friction pad assembly positioned adjacent to said stationary member for engagement with one side of said disc, an indirectly actuated friction pad assembly for engagement with the other side of said disc, an hydraulic actuator in said stationary member and comprising oppositely actuating first and second pistons, said first piston acting on said directly actuated friction pad assembly and said second piston acting through said yoke member on said indirectly actuation friction pad assembly, there being no direct engagement between said yoke and said stationary member for preventing movement of said yoke radially of the disc, drag on said indirectly actuated friction pad assembly being transmitted to said stationary member substantially solely through said yoke member, means for locating said friction pad assemblies against movement in a radial direction comprising a retainer extending between said stationary member and said yoke member over said peripheral edge of said disc, first and second axially spaced support means for supporting said yoke member comprising the sole support of said yoke member, said first support means consisting of a connection between said yoke member and said second piston, and said second support means consisting of said retainer, said retainer comprising spaced parallel arms having corresponding first ends and second ends, and a bridge piece interconnecting said first ends, said second ends being rigidly received in openings in said stationary member, an elastomeric bush being provided between said first end of each said arm and said yoke, mounting means being provided on said yoke member for said bushes, and a releasable connection detachably securing retainer to said stationary member for locating said second ends of said arms against movement in axial direction with respect to said stationary member.

7. An hydraulically operated disc brake as claimed in claim 6, wherein a resilient bush is provided between said yoke member and said second piston.

8. An hydraulically operated disc brake as claimed in claim 6, wherein said yoke is bolted rigidly to said second piston.

9. An hydraulically operated disc brake as claimed in claim 6, wherein said stationary member includes a pair of integrally formed, circumferentially spaced arms having flat outer surfaces along which said yoke member is slidably guided.

10. An hydraulically operated disc brake as claimed in claim 6, wherein said stationary member includes a pair of circumferentially spaced arms, said arms having axially extending grooves, flat outer surfaces forming the base of said axially extending grooves and said yoke member being slidably guided along said flat outer surfaces.

11. An hydraulically operated disc brake as claimed in claim 6, wherein resilient bushes are located between said yoke member and said retainer.

12. An hydraulically operated disc brake as claimed in claim 11, wherein a common bracket upstanding from said yoke carries housings which retain said bushes, said first ends of said arms projecting through said bushes.

13. An hydraulically operated disc brake as claimed in claim 6, wherein the relative dimensions of said bushes, said retainer and said yoke member are chosen such that said yoke member is located at all times in engagement with a flat surface on said stationary member.

14. An hydraulically operated disc brake as claimed in claim 6, wherein each arm includes a step in diameter, the portion of reduced diameter being threaded and projecting through said stationary member, a nut being received on said threaded portion and acting to clamp said step in diameter against said stationary member.

* * * * *